United States Patent [19]
Burkhart, Jr.

[11] 3,764,858
[45] Oct. 9, 1973

[54] BOX AND MOUNTING AND CONNECTING MEANS FOR EXTREMELY HEAVY DUTY WATT-HOUR METERS

[75] Inventor: George N. Burkhart, Jr., Brookston, Ind.

[73] Assignee: Duncan Electric Company, Inc., Lafayette, Ind.

[22] Filed: June 23, 1971

[21] Appl. No.: 156,026

Related U.S. Application Data

[62] Division of Ser. No. 882,013, Dec. 4, 1969, Pat. No. 3,652,936.

[52] U.S. Cl.............. 317/107, 339/185 R, 324/156
[51] Int. Cl. ........................................... H02b 9/00
[58] Field of Search................ 324/196; 339/185 R, 339/198 M; 317/104–108

[56] References Cited
UNITED STATES PATENTS

| | | | |
|---|---|---|---|
| 3,368,118 | 2/1968 | Orr | 324/156 X |
| 3,366,845 | 1/1968 | Esler | 317/106 |
| 3,136,925 | 6/1964 | Klein | 317/107 |
| 3,046,512 | 7/1962 | Remke | 339/185 R |

Primary Examiner—Robert K. Schaefer
Assistant Examiner—Gerald P. Tolin
Attorney—Howard H. Darbo et al.

[57] ABSTRACT

A watt-hour meter has in its base the circular core of a current transformer, wound with the secondary coil, this coil being connected to the current coil of the meter driving unit. The heavy load-carrying conductors extending through this core as its primary winding are carried by the base and are in the form of oppositely facing "U" bars. A special meter box and terminal block facilitates the connecting of this combination in the circuit being measured. Alternatively it may be mounted at a different position, not in the circuit, in which case closing the cover causes the display of words indicating that it is not in service. Shiftable connection links reverse voltage connections in case the supply and load conductors are interchanged from the more usual arrangement, and also facilitate testing. The service connectors are especially suited for very heavy service conductors. Calibration is of the total self-contained meter, i.e. with current transformer as a part thereof.

4 Claims, 11 Drawing Figures

BOX AND MOUNTING AND CONNECTING MEANS FOR EXTREMELY HEAVY DUTY WATT-HOUR METERS

This application is a division of Ser. No. 882,013 filed Dec. 4, 1969.

INTRODUCTION

Watt-hour meters are familiar items as the electricity meters measuring the electrical energy consumption at every home. The present application is especially suitable to such meters designed for measuring loads which are exceptionally heavy for private homes, but which have long presented a problem when large homes are electrically heated. Heretofore, meters for loads over about 200 amperes have required a very expensive installation embodying one or more current transformers which were separate from the meter and had to be separately installed. The installation involved separately connecting its secondary coil to the meter or a meter socket, and a complex undertaking to cause the heavy load current to pass through the aperture of the core of the current transformer, two such transformers usually being used. According to the present invention great economy and simplification of installation are achieved by providing a meter with a built-in current transformer, the built-in primary or load-carrying conductors of this transformer being arranged for easy application of this total combination a unit to a specially designed terminal block to which the heavy supply and load conductors leading into the meter box are connected.

The need for more heavy duty metering has been present for many years, and has constantly increased through the years. The assignee of the present invention has been a leader in satisfying this need to the extent that it could be satisfied by direct metering. In direct metering, as the term is here used, the entire current or aperage of the circuit being metered goes through the current coil of the meter itself. In spite of advances, the limit in this direction seems to have been reached at around 200 amperes. At least one suggestion has reached the present inventor that there should be a self-contained 300 ampere meter.

With loads above about 200 amperes, and sometimes even below it, metering has been done indirectly, using current transformers applied to the metered circuit and from which connections ran to the meter. The current in the circuit being measured did not pass through the meter but it passed instead through a primary conductor or "winding" of the current transformer. Only the lighter amperage of the secondary winding of this current transformer would then flow through the current coil of the meter. Meters to be used this way were routinely calibrated separately, and only ordinary test currents were required.

This system, which has been used for many years, has been objectionally expensive and inconvenient; increasingly so as larger and any larger numbers of installations required the specially installed and specialy connected current transformers, and special voltage connections needed when the service conductors do not go to the meter, According to the present invention the need for self-contained meters for loads far beyond 200 amperes is satisfied, and both the expense and the inconvenience of prior indirect metering previously used for this are considerably reduced.

Some relatively unexpected advantages have resulted. One is greater dependability of metering accuracy. In the past, indirect metering has sometimes been inaccurate due to aberrations of current transformers. The current transformers are amazingly uniform, but do have minute variations, and these would of course make a perfectly accurate meter give an inaccurate reading. The inaccuracy was usually small enough to be tolerated, but occasional larger inaccuracies were likely to be undetected. With the present invention, these inaccuracies are avoided because the current transformers are part of the unit routinely calibrated.

Additional advantages will be apparent from the following description and the drawings.

DESIGNATION OF FIGURES

Figure 6:
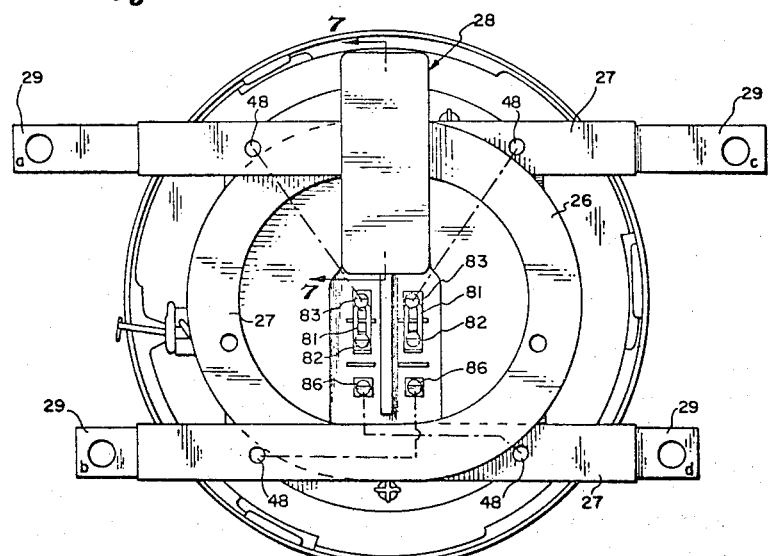
FIG. 6 is a rear view of the structure of FIG. 5, as indicated by the line 6—6 of FIG. 5.
Figure 7:
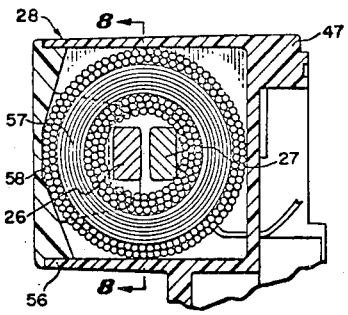
Figure 8:
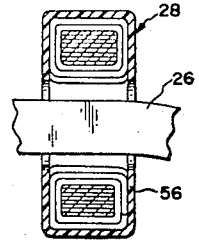

FIG. 7 and 8 are sectional views through the current transformer, FIG. 8 being approximately on the line 8—8 of FIG. 7 and FIG. 7 being approximately on the line 7—7 of FIG. 6.

Figure 3:
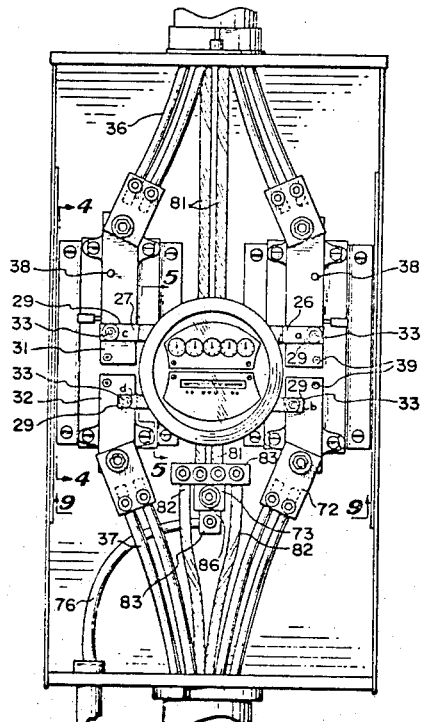
FIG. 3 is a front view of the structure of FIG. 1, with a box cover removed and on a larger scale
Figure 9:
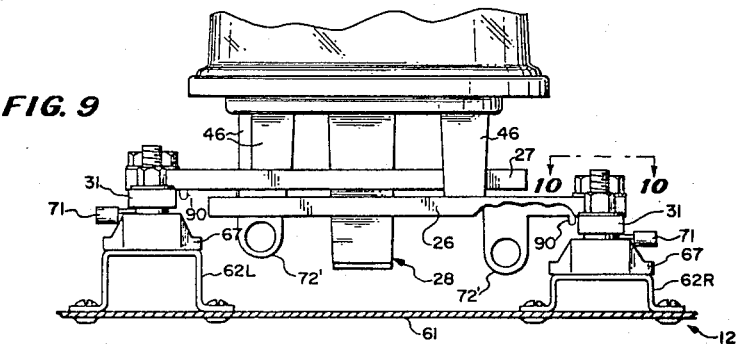

FIG. 9 is a sectional view through the box approximately on the line 7—7 of FIG. 3, showing a bottom view of the contents of the box.

Figure 10:
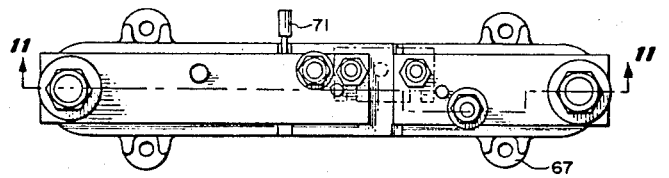
Figure 11:
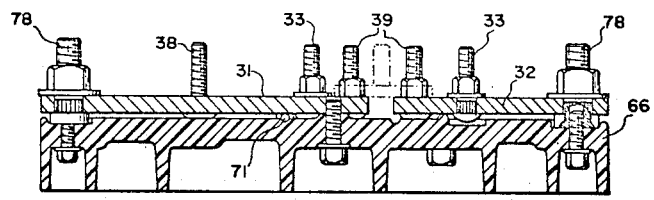

FIGS. 10 and 11 are respectively front and vertical sectional views of the terminal block facilities of the meter box, as indicated by the lines 10—10 of FIG. 9 and 11—11 of FIG. 10.

BACKGROUND DESCRIPTION

In some fundamental respects the embodiments of the present invention correspond to practice which has long been followed, although the elements here described include departures from the common practice. Thus it has been common to mount a watt-hour meter 11 in a metal meter box 12 having a cover 13 through which the bowl-shaped glass cover 14 of the meter 11 projects forwardly. Thus although the meter dials and some of the meter mechanism was visible through the glass cover, the meter was thoroughly protected within the metal box. The cover of this box has been conventionally secured closed by some sort of tamperproof mechanical sealing device. Usually conduits 16 and 17 have extended from the top and bottom of the box, one being for the power supply conductors and the other being for the load conductors, i.e. the conductors leading to the circuit on the load side of the meter.

Probably the most widely known elements of the meter 11 are the dial pointers 18 by which the meter is read and the disk 19 (FIG. 5) which rotates generally in accordance with the use of power. The disk 19 is driven by inductive interaction between it and two electromagnets. One is a current magnet 21 and other is the potential or voltage magnet 22. The voltage magnet 22 is energized by voltage coil 23. The current magnet 21 is energized by a current coil 24, the illustrated form being different from the more common type of current coil. The illustrated form of current coil 24, comprising a substantial number of turns of moderately small wire, is the type used when it is connected to a current transformer.

Current transformers are used when the circuit being measured is extremely heavily loaded. In other situations, as in most residential meters, the current coil is a relatively heavy conductor, perhaps of only one or two turns, and the total current in the circuit being measured flows through it. When a current is the circuit being measured flows through it. When a current transformer is used, the heavy current of the load circuit does not pass through the internal meter coils. It flows only through one or more heavy conductors, represented in FIG. 6 (in a very novel form and arrangement) by conductors 26 and 27, threading the core of the current transformer. A current transformer such as transformer 28 has heretofore been quite separate from the meter and may have been located relatively remotely from it. Such a current transformer is energized by the current of the circuit being metered, flowing in a heavy conductor threading its core, and in turn has energized the current coil 24. The current through the coil 21 is much smaller than the current of conductors 26 and 27, but proportional thereto.

Although the following disclosure offered for public dissemination is detailed to ensure adequacy and aid understanding this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

DESCRIPTION OF PRESENT INVENTION

According to the present invention, a simplified practical meter combination has been developed which includes as an integrated part of it a current transformer 28 complete with terminal-ended conductors 26 and 27 which energize it. In addition to advantages in economy of manufacture, these are important advantages along the line of being able to handle this complete combination much as the meters along have heretofore been handled. Thus as is quite clear from FIGS. 5 and 6, the new meter and current transformer combination is a self-sufficient unit having its own connecting terminals collectively 29 but distinguishable by supplemental designations a, b, c and d, exposed at the rear thereof, in predetermined positions, as seen in FIG. 6. Theoretically this would make it possible to plug in these meter combinations just as simple meters heretofore have been plugged in. Because of the heavy loads, however, it is preferred not to use plug in features such as springs, but to use the type of connection and mountings shown in FIGS. 1 and 3 wherein two of the meter terminals 29 are shown resting on connector block conductors 31 and 32 to which they are firmly secured by screws or terminal bolts 33.

OUT OF SERVICE POSITION

Figure 1:
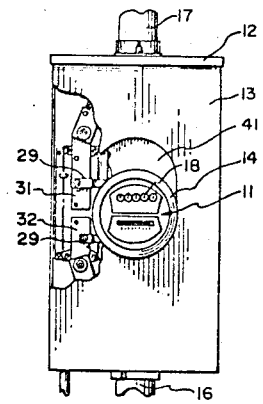
FIGS. 1 and 2 are front views of meter box with meter therein, the cover of the box being broken away to show the meter terminals; the meter of Figure being in the service position, and the meter of FIG. 2 being in its out of service position.

In FIGS. 1 and 3 it is clearly seen that the terminal block conductor 31 connects the meter terminals 29c with upper conductors 36, while terminal block conductor 32 connects meter terminal 29d with lower conductors 37, since as seen in FIG. 6, terminals c and d are two terminal ends of U-shaped conductor bar 27, it is apparent that the conductor bar 27 is connecting the conductors 36 and 37 through the current transformer 28. Thus the meter is connected in the circuit in which it is metering.

Figure 2:
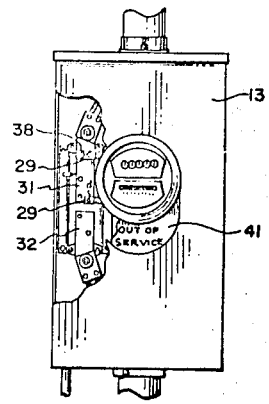
Figure 4:
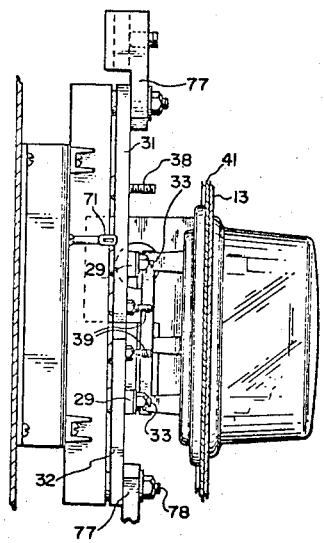
FIG. 4 is a fragmentary view sectionally through the box approximately along the line 4—4 of FIG. 3, showing a side view of the box contents. For the sake of clarity of illustration there are some inconsistencies with other figures.

Sometimes, however, it is desired to have the meter present without it being connected in the circuit. This could occur, for example, if the meter is initially installed before the entire load circuit is ready for service. In this event, the meter would not be positioned as shown in FIG. 1 and 3, but would instead be positioned as shown in FIG. 2. In this instance, the meter terminal 29c is mounted on conductor 31 by means of hanger bolt 38. As seen clearly in FIG. 4, the hanger bolt 38 may be constantly present and is considerably higher than the terminal bolt 33. Of course, if the meter had previously been installed in its service position, the four nuts on the bolts 33 would be unscrewed to permit the meter combination to be lifted off of the bolts 33 and hung on the hanger bolts 38, nuts being applied to these bolts to hold the meter in place. At this time, as clearly seen in FIG. 2, the lower meter terminal 29d does not rest on the terminal conductor 32 but rests near the lower end of the terminal conductor 31. It therefore no longer completes a circuit between service conductors 36 and 37. Under this condition, the load conductors will not be energized or "hot." It is important, however, that there be by-pass provisions so that if it should be desired for services not to be interrupted, a temporary by-pass connection can be applied. Conductors 31 and 32 are close to one another to make such by-pass convenient. For example, if a meter needed to be tested without interrupting the service, a by-pass could first be applied at each side in the form of a simple conductive bar (with an insulated handle) applied to the bolts 39. Then the meter could be released and removed for testing, or moved to its upper out of service position as already described.

It is preferable that the meter box cover 13 be provided with a slide 41, vertically movable in slideways not shown, and having an aperture in it which neatly fits the glass cover 14 of the meter. Then if the cover is applied while the meter is out of service, this slide 14 must be in its upper position, and it is preferably provided with the legend "Out of Service" which will be visible, as seen in FIG. 2, under this condition.

One common arrangement of the terminal block conductors 31 and 32 is shown in FIG. 3, one above the other to be connected together through a single conductor of the meter and current transformer combination. For three wire circuits there is another such pair 31, 32 at the other side of the assembly. Both by custom and for technical considerations, the supply conductors 37 often enter at the bottom of the box and the load conductors 36 at the top, or vice versa. It has been found to be practicable to provide a simple arrangement of the current transformer facilities which is compatible with this desirable conductor arrangement. Arrangements can also be made for both the supply and load conductors to enter at the same end of the box.

CURRENT TRANSFORMER FEATURES

Compatibility with the terminal block conductor locations just described, while at the same time providing proper conductor relationship with the current transformer 28, is achieved by the delightfully simple arrangement seen in FIG. 6. Here it is seen that each of the heavy conductors 26 and 27 is a simple U-shaped bar, the two bars being slipped through the current transformer from opposite directions. Thus it is seen that the upper leg of each U of the bars 26 and 27 extends through the current transformer 28. Because current flow at a given moment is in the same direction (left or right) through both of these upper legs, there is the necessary additive effect as to their excitation of the current transformer.

Figure 5:
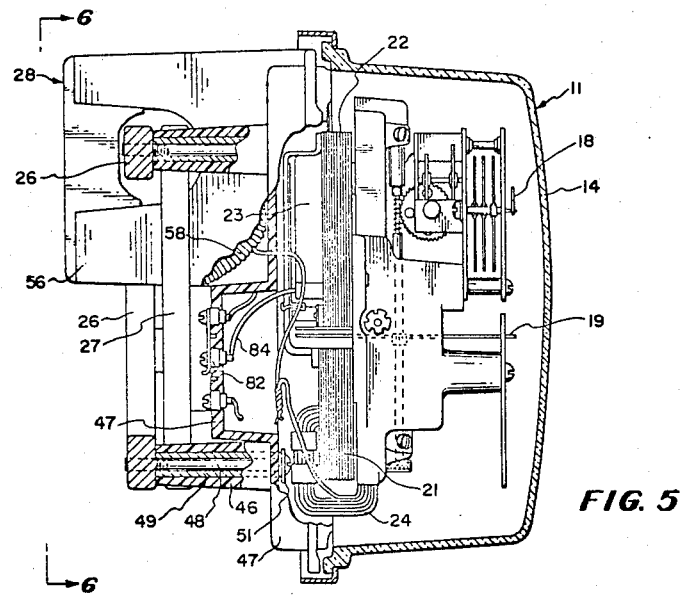
FIG. 5 is a vertical sectional view through the meter and current coil combination comprising the heart of the present invention.

Each of the U-bars 26 and 27 is firmly secured to or as a part of the meter 11 by a floating three point mounting. At each of the three points the mounting is substantially as seen in FIG. 5, where the lower mounting for the bar 26 has been broken away. A mounting post 46 is provided as an integral part of meter base 47, this meter base being molded of an insulating plastic material. A screw 48 extends through the post 46 and screws into U-bar 26. A conductive spacing sleeve 49 surrounds the screw 48. This permits a voltage lead terminal 51 to be firmly clamped between the head of the screw 48 and the sleeve 49. The voltage terminal 51 is connected to the voltage coil and a metal-clamped connection to the terminal 51 is therefore desirable. The metal-clamping avoids any danger of deterioration of the voltage connection as the result of cold-flowing of plastic in the course of time as could occur if the clamping were dependent upon plastic.

Although the sleeve 49 should be minutely longer than the plastic through which it extends, and ths might seem to be inconsistent with the desired predetermined positioning of the terminals 29, there is no such difficulty. Indeed, the minute play possible between the conductors 26 and 27 and the plastic base 47 avoids any danger that harmful strains would be applied to the plastic base in the course of tightening the terminals 29 against the four separate terminal block conductors 31 and 32.

The two bars 26 and 27 serve as the primary winding of the current transformer 28, even though they do not have the appearance of a "winding." The remainder of the current transformer is preferably positioned accurately independently of these bars so as to be out of contact with them. To this end the meter base 47 is, as seen in FIG. 7, molded with a housing 56 extending rearwardly therefrom. It may conveniently be opened rearwardly, until filled, and provides a passage for bars 26 and 27.

The core 57 of the current transformer is preferably strip wound. One or more long strips of material known as transformer iron are wound upon themselves spirally to provide a transformer of the desired dimensions and core characteristics. The secondary winding 58, which is a toroidal winding, is then wound upon it by known techniques. The completed assembly is inserted in the housing 56 and covered by a molded cap.

In view of the importance of having an economical but dependably satisfactory current transformer, some details and precautions are here noted. The transformer core strip is of a type with surface insulation to reduce any eddy currents passing between turns. After coiling, it is annealed at 1,400 degrees F. for 2 hours in a dry nitrogen atmosphere. Corners on which the winding will bear are rounded and thereafter the core is epoxy coated as by a fluidized bed. A suitable winding has been found to be 319 turns, providing three layers of turns on the inside of the core, of insulated round copper wire, No. 19 "Polythermaleze" heavy film being one that is suitable.

Conductors 26 and 27 are preferably coated with insulation except at the terminals 29 and at the points where the sleeves 49 contact the conductors.

TERMINAL BLOCK CONSTRUCTION

Although, of course, the shape and manner of supporting and connecting the terminal block conductors 31 and 32 may be varied, the form illustrated in FIGS. 9 to 11 has been found to be quite satisfactory. It will be observed from FIG. 9 that the location of U-bar 26 rearwardly of the U-bar 27 necessitates having the conductor 31 on the right closer to the back wall 61 of the box 12 than is the left-hand conductor 31. Nevertheless, some identical parts are found on opposite sides. However, metal brackets or benches 62L and 62R are provided which are identical except for being of different heights. These are secured by screws to the back panel of the meter box 12. To each of these is secured a terminal block assembly. The base portion of which is a molded insulative terminal block 66. Then may be identically molded, with some drilled holes at mirror-image positions. As seen in FIG. 10, each terminal block has four ears 67 through which screws thread into the bench 62R and 62L for securing the terminal block 66 in place. Before being secured in place, each terminal block is provided with the remainder of the terminal block assembly as seen in FIG. 11 except that, if preferred, nuts may be omitted. The essential parts have been described heretofore. For protection from voltage surges such as may be induced by lightning, spark-gap assemblies 71 may be provided. Each has one of its terminals grounded, and the other clamped under conductor terminal 31 or 32, choosing the ones connected to supply lines.

The various connectos 72 and 73 may be varied according to the nature of the service conductors 36 and 37. Two considerations are important: one is that there be very firm clamping of the conductors to the connectors end of the connectors to the terminal block conductors 31 and 32. The other is that the connectors 72 and 73 be separable from the terminal block conductors 31 and 32 and be adaptable to different angular positions with respect thereto. This latter is because of great stiffness of the heavy conductors used for the extremely heavy loads for which the meter combination is designed. These considerations are satisfied by providing the terminal clamps of the solid block type shown, having at one end one or more sockets (with lateral clamping screws unless compression fittings are used) for the conductors and at the other end a flat shank 77, which may be firmly clamped to its appropriate terminal block conductor 31 or 32 by a nut on securing screw 78. If all service conductors enter at the bottom, one set can extend up behind the meter to long-shanked terminal connectors 72' (FIG. 9) each provided with a rib 90 to prevent its swinging, thereby maintaining adequate clearance from grounded parts. Neutral conductors such as 79 are connected together, as by a multiple connector 80, and grounding conductor 85 may be connected to connector 83 by its own connector clamp 86.

SHIFTABLE VOLTAGE LINKS

The direction of the current flow in the bar 26 at a given instant, and hence the direction of current flow through the aperture of the current relay 28, depends on whether the meter is top fed or bottom fed. That is, it depends on whether the conductors leading from the utility lines enter the bottom of the meter box through conduit 16 or the top through conduit 17. In order that the disk 18 will rotate in the right direction, under both circumstances, it is necessary to be able to reverse the connections of the voltage coil 23. This is accomplished by shifting the links 81 seen in FIG. 6. Usually the manufacturer will position these links in the upper position shown in FIG. 6, because that is correct for the more common top fed meter box wiring. As seen in FIG. 6, the links 81 in this upper position connect central terminals 82 with upper terminals 83. As seen in FIG. 5, the central terminals 82 are the ones to which the leads 84 from voltage coil 23 are connected. If the meter is to be used in a bottom fed box, the screws of FIG. 6 are loosened and the links 81 are swung to bridge between center screws 82 and lower screws 86.

For the occasional installation having supply and load conductors entering the box at the same end one set of connectors may be available with sockets opening on a side. If these connectors are somewhat horizontally disposed, conductors clamped in them can extend generally vertically to pass behind the meter.

The respective connections for the upper screws 83 and the lower screws 86 are represented in FIG. 6 by broken lines. The reverse connections can be easily recognized by seeing that the right-hand screw 83 is connected to conductor 27, while the right-hand screw 86 is connected to conductor 26. In each instance, the connection is through a screw-tightened spacer 49.

It may also be observed that with each position of the links 81, the connection to the proper bar 26 or 27 is made on the supply side of the transformer 28. This avoids charging the consumer for the power required to energize the voltage coil of his meter. Thus, if we assume top feeding, the connection of conductor 26 to the external power supply lines is by its upper or *a* terminal 29, and if we follow conductor 26 from that point we see that before it passes through the current transformer 28 we come to the screw 48 by which conductor 26 is now connected to the voltage coil through terminal 83, link 81 and terminal 82. If, however, the lower or *b* terminal 29 were connected to the source of supply we would follow from the point in the opposite direction but again before reaching the transformer 28 we come to the lower screw 48 which would now be connected to the voltage coil through the screw 48, terminal link 81 in its lower position and terminal 82.

For testing of the meter it is usually desired to disconnect the voltage coil from the load-carrying conductors. The same links 81 satisfy this need, because they can be turned out horizontally so as not to engage either screws 83 or screws 86.

ACHIEVEMENT

The achievements of this invention are most important in the areas of economy and convenience. Instead of a great deal of expensive field service and material costs for installing a separate current transformer and its connections to the meter, and expensive supervision and checking to be sure that this complex task is done right, nearly everything is done by more efficient factory operations, and with novel structural arrangements which, even aside from factory efficiency, minimize material and labor costs. The factory produced meter unit, complete with built-in current trasnformer, with its "primary winding" conductors already installed, can be mounted and connected in the meter box, provided with the matching terminal block facilities of this invention, with much the same ease and certainty of correctness as in the case of the more simple and common direct metering. In its preferred form, the meter and meter box combination even automatically provides an indication when it is in its out of service position. Easily shifted potential links provide for the necessary reversal of the current coil connections if the supply and load conductors leading to the meter box are reversed from their usual positions, the same links providing a disconnect position desired for meter testing.

Another important achievement, one which could be of growing importance, is improved dependability of metering accuracy. Using this invention, the meter and current transformer combination is naturally calibrated as a unit. Aberrations of the current transformer from its expected performance which would cause inaccurate metering if connected to a meter previously calibrated to accuracy will not have that effect now. Instead, the calibrating adjustment of the "meter proper" in the combination will inevitably adjust it to compensate for the aberration of its associated current transformer. It is the combination, just as it will be used, wich is calibrated to accuracy. The widely used "phantom load" energization of the meter can be used because the test links are turned to isolate the voltage coil from the conductor bars 26 and 27. The heavy test amperage through the bars 26 and 27 is thus at a much lower voltage than normal voltage impressed on the voltage coil.

The U-shaped conductor bars permit terminal block facilities which are simple but nevertheless have correct terminals in proximity to one another for connection by a simple by-pass. This important proximity-for-by-pass could also be achieved (and in polyphase use of this invention may have to be achieved) by complex terminal block facilities, in which case straight conductor bars may be used to carry the current through the core of the built-in current transformers.

Because the secondary coil 58 of the current transformer is permanently connected to the current coil 24, there is no need for expensive short circuiting switches which were previously an important safety measure because of high voltage such a secondary coil develops if its circuit is open while it is energized.

The spacing difference between the upper terminal bolts 33 on the one hand and the other terminal bolts 33 on the other hand prevents upside-down mounting of meters, one method of stealing electrical energy.

I claim:

1. A meter box and mounting means for a watt-hour meter including a metal box, a cover for the box having an aperture for a meter cover to extend therethrough, insulative terminal block means secured to the box on the inside thereof and terminal conductors carried by the terminal block means and each including a connector clamp for connection to a service conductor and a terminal portion for connection to a meter; said terminal conductors comprising two sets whereby one set can be connected to supply conductors and another set connected to load conductors; characterized by:

each terminal portion having a forwardly projecting terminal bolt thereon for receiving a meter conductor bar to be clamped to the conductor by a nut on the bolt for connecting and supporting the meter;

pairs of said terminal conductors including one conductor from each set extending into proximity to one another at points spaced from said terminal bolts to be adapted to have bypass connections clamped thereto; hanger bolts in addition to said terminal bolts positioned within the meter box to receive and support conductor bars of said meter so located that a meter thereon having its conductor bars dimensioned to span the terminal bolts for connecting one set of conductors to the other will not do so when mounted on said additional hanger bolts; and a mask supported by the box cover and having a passage therethrough for receiving a meter cover, with relative snugness and said mask being shiftable between two positions in each of which it can accommodate a meter cover projecting through the aperture; the mask in one position receiving a meter cover when its meter is supported by the terminal bolts and in the other position receiving a meter cover when its meter is supported by the hanger bolts; the aperture exposing different portions of the mask in the two mask positions, one of said portions bearing indicating means.

2. A meter mounting means and watt-hour meter combination, the mounting means including insulative terminal block means and terminal conductors carried by the terminal block means and each including a connector clamp for connection to a service conductor and a terminal portion for connection to a meter, said terminal conductors comprising two sets whereby one set can be connected to supply conductors and another set connected to load conductors; characterized by:

each terminal portion having a forwardly projecting terminal bolt thereon for receiving a meter; the meter being normally connected to and hung by said terminal bolts and including a conductor bar spanning between and connecting a pair of conductors, one of each set, and clamped to each conductor by a nut on the bolt;

pairs of said terminal conductors including one conductor from each set extending into proximity to one another at points spaced from said terminal bolts to be adapted to have bypass connections clamped thereto while the meter is normally connected; and hanger bolt means in addition to said terminal bolts position within the meter box to receive and support said conductor bars of said meter when desired but so located that when the meter is thereon its conductor bars will not span the terminal conductors for connecting one set of conductors to the other;

the dimensions between the terminal bolts of one set of terminal conductors being different from the dimension between the other set of terminal bolts to prevent inverted installation of the meter.

3. The combination of a watt-hour meter, a meter box and mounting means for the meter including a metal box, a cover for the box, insulative terminal block means secured to the box on the inside thereof and terminal conductors carried by the terminal block means and each including a terminal portion for connection to the meter, and a connection portion for connection to a service conductor; said terminal conductors comprising two sets whereby one set can be connected to supply conductors and another set connected to load conductors; characterized by:

the terminal portions of at least one pair of terminal conductors, made up of a terminal conductor in each set, each having a forwardly projecting stud thereon normally receiving and supporting a meter-supporting conductor bar to be clamped to the conductor for connecting the meter;

a conductor in conductive relationship to one of the terminal conductors of a pair from each set, extending into proximity to the other at points spaced from said terminal studs to be adapted to have bypass connections clamped thereto;

additional stud means positioned within the box to receive and support said meter at will and so located that when the meter is thereon its conductor bars will not span the pairs of terminal conductors for connecting one set of conductors to the other; and the box cover being constructed to close the box with visibility of a meter through the cover in each of the two meter positions.

4. The combination of a watt-hour meter, a meter box and mounting means for the meter including a metal box, a cover for the box, insulative terminal block means secured to the box on the inside thereof and terminal conductors carried by the terminal block means and each including a terminal portion for connection to a meter, and a connection portion for connection to a service conductor; said terminal conductors comprising two sets whereby one set can be connected to supply conductors and another set connected to load conductors, characterized by:

the terminal portions of at least one pair of terminal conductors, made up of a terminal conductor in each set, each having a forwardly projecting stud thereon normally receiving and supporting a meter-supporting conductor bar to be clamped to the conductor for connecting the meter;

a conductor in conductive relationship to one of the terminal conductors of a pair from each set, extending into proximity to the other at points spaced from said terminal studs to be adapted to have bypass connections clamped thereto;

additional stud means positioned within the box to receive and support said meter at will and so located that when a meter is thereon its conductor bars will not span the pairs of terminal conductors for connecting one set of conductors to the other; and the box cover being constructed to close the box with visibility of a meter through the cover in each of the two meter positions and to selectively expose an out of service indication means while closing the box with the meter on said additional stud means.

* * * * *

UNITED STATES PATENT OFFICE
CERTIFICATE OF CORRECTION

Patent No. 3,764,858                    Dated  Oct. 9, 1973

Inventor(s)  George N. Burkhart, Jr.

It is certified that error appears in the above-identified patent and that said Letters Patent are hereby corrected as shown below:

Column 3, line 2, before "other" insert -- the -- .
Column 3, lines 16 and 17, delete "When a current is the circuit being measured flows through it."
Column 3, line 30, "21" should be -- 24 -- .
Column 3, line 50, "these" should be -- there -- .
Column 3, line 52, "along" should be -- alone -- .
Column 6, line 27, "assembly. The" should be -- assembly, the -- .
Column 6, line 28, "Then" should be -- They -- .
Column 6, line 47, "end" should be -- and -- .
Column 7, line 27, insert -- , -- after "end".
Column 7, line 52, "the" should be -- that -- before "point".
Column 8, line 7, "trasnformer" should be -- transformer --.
Column 8, line 57, "other" should be -- lower -- .
Column 9, line 56, "position" should be -- positioned -- .

Signed and sealed this 19th day of February 1974.

(SEAL)
Attest:

EDWARD M. FLETCHER, JR.          C. MARSHALL DANN
Attesting Officer                 Commissioner of Patents